United States Patent
Hasegawa et al.

(10) Patent No.: US 12,135,727 B2
(45) Date of Patent: Nov. 5, 2024

(54) FILE INGESTION IN A MULTI-TENANT CLOUD ENVIRONMENT

(71) Applicant: International Business Machines Corporation, Armonk, NY (US)

(72) Inventors: Tohru Hasegawa, Tokyo (JP); Masaki Wakao, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 17/526,622

(22) Filed: Nov. 15, 2021

(65) Prior Publication Data
US 2023/0153313 A1    May 18, 2023

(51) Int. Cl.
| | | |
|---|---|---|
| *G06F 16/2458* | (2019.01) | |
| *G06F 11/34* | (2006.01) | |
| *G06F 16/22* | (2019.01) | |
| *G06F 16/25* | (2019.01) | |

(52) U.S. Cl.
CPC ...... *G06F 16/2477* (2019.01); *G06F 11/3419* (2013.01); *G06F 16/22* (2019.01); *G06F 16/254* (2019.01); *G06F 16/258* (2019.01)

(58) Field of Classification Search
CPC .... G06F 16/2477; G06F 16/22; G06F 16/258; G06F 16/254; G06F 11/3419
USPC ........................................................ 707/690
See application file for complete search history.

(56) References Cited

U.S. PATENT DOCUMENTS

| 10,430,713 | B2 | 10/2019 | Allen | |
|---|---|---|---|---|
| 2002/0191848 | A1* | 12/2002 | Boose | G06F 40/131 |
| | | | | 382/181 |
| 2010/0180191 | A1* | 7/2010 | Taber | G06F 16/5846 |
| | | | | 707/E17.061 |
| 2013/0339316 | A1* | 12/2013 | Hirsch | G06F 3/0641 |
| | | | | 707/E17.032 |

(Continued)

OTHER PUBLICATIONS

"Activity Monitor", SNYPR 6.4, Securonix, downloaded from the Internet on Oct. 7, 2021, <https://documentation.securonix.com/onlinedoc/Content/6.4%20Multi-tenant/Content/SNYPR%206.4/6.4%20Guides/Administration%20Guide/6.4%20Activity%20Monitor.htm>, 12 pages.

(Continued)

*Primary Examiner* — Hosain T Alam
*Assistant Examiner* — Saba Ahmed
(74) *Attorney, Agent, or Firm* — Heather Johnston

(57) ABSTRACT

Systems, methods, and computer programming products for estimating ingestion time of ingested files to be transformed into a searchable state for content mining by an on-premises computing environment or cloud environment, including multi-tenant cloud environments. Ingested files being indexed are analyzed for divisibility. Ingestion time varies based on the number of divisible elements (such as lines) of data within the ingested file and the amount of data per divisible element. A converter divides files into a plurality of elements treated as independent data and calculates the estimated ingestion time based on the number of divisions and file size for each divisible element. Estimated ingestion time is stored to internal fields corresponding to each divisible element in the index for the search data. During content mining, an internal condition is added to received search queries, displaying only search results where the estimated ingestion time is older than the current time.

20 Claims, 9 Drawing Sheets

(56) References Cited

U.S. PATENT DOCUMENTS

| | | | | |
|---|---|---|---|---|
| 2014/0143276 | A1* | 5/2014 | Rogers | G06F 16/252 707/776 |
| 2014/0324879 | A1* | 10/2014 | Trease | G06F 16/951 707/756 |
| 2016/0019462 | A1* | 1/2016 | Allen | G06F 16/24522 706/12 |
| 2016/0034525 | A1* | 2/2016 | Neels | G06F 16/285 707/737 |
| 2017/0220651 | A1* | 8/2017 | Mathew | G06F 16/285 |

OTHER PUBLICATIONS

"Log data ingestion time in Azure Monitor" Jul. 18, 2019, <https://docs.microsoft.com/en-us/azure/azure-monitor/logs/data-ingestion-time>, 7 pages.

Marquardt, Alex, "Calculating ingest lag and storing ingest time in Elasticsearch to improve observability", Jun. 16, 2020, Engineering, 6 pages, <https://www.elastic.co/blog/calculating-ingest-lag-and-storing-ingest-time-in-elasticsearch-to-improve-observability>.

Mell et al., "The NIST Definition of Cloud Computing", Recommendations of the National Institute of Standards and Technology, Special Publication 800-145, Sep. 2011, 7 pages.

Vadlapatla et al., "Secure multi-tenant data ingestion pipelines with Amazon Kinesis Data Streams and Kinesis Data Analytics for Apache Flink", Jul. 21, 2021, Amazon Kinesis, Analytics, Kinesis Data Streams, AWS Big Data Blog, 10 pages, <https://aws.amazon.com/blogs/big-data/secure-multi-tenant-data-ingestion-pipelines-with-amazon-kinesis-data-streams-and-kinesis-data-analytics-for-apache-flink/>.

\* cited by examiner

```
                                                              ┌─ 301
  ┌──────────────────────────────────────────────────────────/──────────────────────────────┐
  │ claim_id,date,claim_product,client_location,client_age,body ◄────── 303                  │
  │                                                                                         │
  │ 0,2016/1/1,lemon tea,Manhattan,20,The straw was missing from the juice pack ◄────── 305  │
  │                                                                                         │
  │ 1,2016/1/2,vanilla ice cream,Queens,22,I purchased ice cream and found a foreign object inside the cup │
  │                                                                                    307  │
  └─────────────────────────────────────────────────────────────────────────────────────────┘
```

FIG. 3A

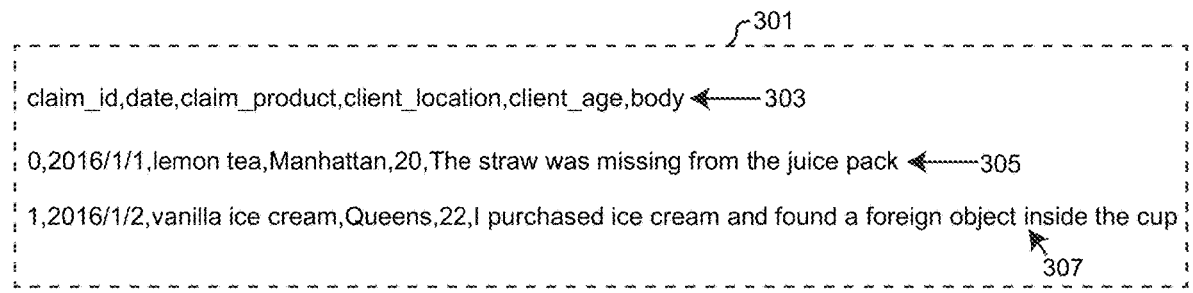

FIG. 3B

FILE INGESTION IN A MULTI-TENANT CLOUD ENVIRONMENT

TECHNICAL FIELD

The present disclosure relates generally to the field of data analytics, and content mining. More specifically, the present disclosure relates toward accurately estimating ingestion time of ingested files into a searchable state in a multi-tenant cloud environment.

BACKGROUND

Content mining is the process of sorting through large data sets to identify patterns and relationships that can help solve business problems through data analysis. Content mining techniques and tools enable enterprises to predict future trends and make more-informed business decisions. Content mining is one of the core disciplines in data science, which uses advanced analytics techniques to find useful information in data sets. At a more granular level, content mining can be a step in the knowledge discovery in databases (KDD) process, a data science methodology for gathering, processing and analyzing data.

Core elements of content mining include machine learning and statistical analysis, along with data management tasks performed to prepare data for analysis. The use of machine learning algorithms and artificial intelligence (AI) tools automate more of the process and make it easier to mine massive data sets, such as customer databases, transaction records and log files from web servers, mobile apps and sensors. The content mining process can be broken down into four primary stages, data gathering, data preparation, mining and analysis. During data gathering, relevant data for an analytics application is identified and assembled. The data may be located in different source systems, a data warehouse or a data lake that contains a mix of structured and unstructured data. External data sources may also be used. Data preparation starts with data exploration, profiling and pre-processing, followed by data cleansing to fix errors and other data quality issues. Data transformation is also done to make data sets consistent unless a data scientist is looking to analyze unfiltered raw data for a particular application. Once the data is prepared, a data scientist chooses the appropriate mining technique and then implements one or more algorithms to do the mining. In machine learning applications, the algorithms may typically be trained on sample data sets to look for the information being sought before they're run against the full set of data. Finally, during data analysis and interpretation, data mining results are used to create analytical models that can help drive decision-making and other business actions.

SUMMARY

Embodiments of the present disclosure relate to a computer-implemented method, an associated computer system and computer program products for estimating ingestion time of files indexed and made searchable for content mining. The computer-implemented method for estimating ingestion time of ingested files comprises ingesting, by a processor, the file from a data source system storing the file; identifying, by the processor, whether the file is divisible into a plurality of elements where each of the plurality of elements are treated as independent data; estimating, by the processor, the ingestion time (G) for each divided element of the file, wherein the estimated ingestion time considers a number of divided elements in the file, an amount of data included in the divided elements of the file, a start time of ingestion of the file, and an ingestion time estimated with a maximum number of users using computing resources simultaneously; and indexing, by the processor, search data of the file to an index and storing the estimated ingestion time for each divided element of the file to an internal field of the search data of the file being indexed.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

FIG. 3A depicts an example of a portion of a CSV file capable of being ingested and indexed in accordance with the present disclosure.

FIG. 3B depicts the portion of the CSV file of FIG. 3A ingested and indexed in accordance with the present disclosure.

DETAILED DESCRIPTION

Figure 1A:
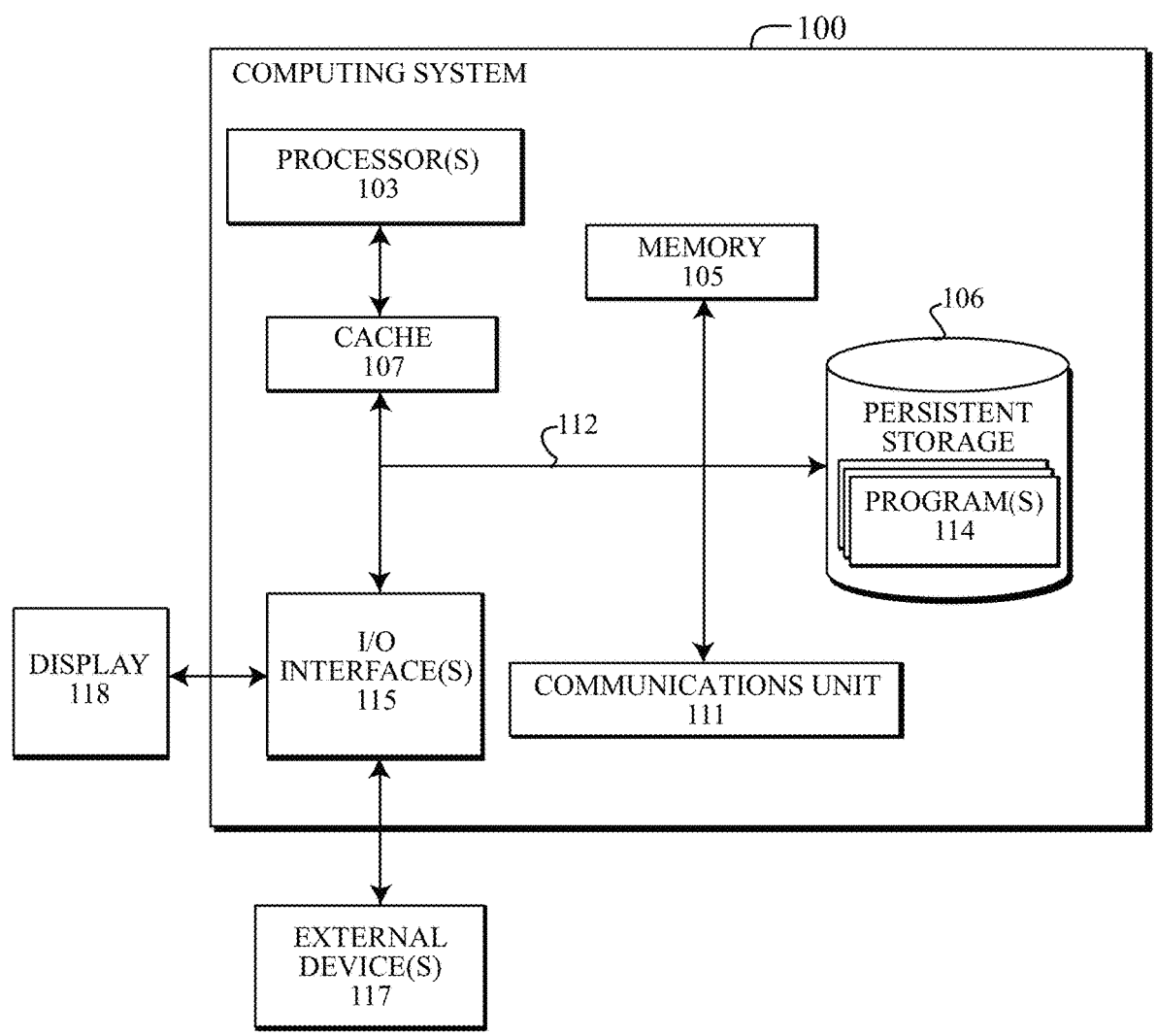
FIG. 1A depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Content mining may be carried out in multiple steps. During the first step, data that will be mined may be ingested and the ingested data may be further enriched with one or more facets or attributes of the objects within the data set, along with any identified sentiments associated with the data being ingested. An index can be prepared which places the ingested data into a searchable format and state. During the next step of content mining, users can quickly search the index, narrow down information and analyze the ingested data of the prepared index to obtain knowledge from the ingested data. When performing content mining using an on-premises system, fixed hardware resources may be used to measure ingestion time based on typical data usage in a fixed setting. As a result, measurements of data usage can be used to estimate actual data usage. This may be referred to as a typical estimation method.

Embodiments of the present disclosure recognize that in situations where content mining is being performed as part of a multi-tenant cloud solution, estimating ingestion time using typical estimation methods performed for on-premises systems may not be feasible because in a multi-tenant cloud environment it is usually unknown when other users ingest data, the types of settings other users are adopting and how much data other users are ingesting into the system. Moreover, time spent ingesting data may vary depending on whether other users are deploying some of the hardware resources at the same time and the total number of simultaneous users occupying hardware resources.

Embodiments of the present disclosure leverage a novel method, system and computer program products that are capable of estimating ingestion time for transforming ingested files into a searchable state regardless of whether the computing environment is an on-premises computing environment, single-tenant cloud computing environment and/or a multi-tenant cloud computing environment. During ingestion of a file, a converter module detects and confirms whether the file being ingested from a data source can be divided into separate elements that can each be treated as independent data. Based on a total number of divisions (or divided elements) within the file, a division number counted from the beginning of the file and the file size for each divided element of the file, the converter can calculate an estimated ingestion time. In an instance where the file being ingested is not divisible into a plurality of elements, for example, text files and Hypertext Markup Language (HTML) files, the estimated ingestion time can be calculated based on file size, while the number of divisions as well as the division number counted from the beginning of the indivisible file can both be set to a value of 1. The estimated ingestion time for each of the divided elements of the ingested file, or in the case of an indivisible file the single element of the ingested file, can be added as internal data to the ingested file. During indexing of the ingested file, an indexer may add the estimated ingestion time previously added as internal data, as a field within the indexed record of file being indexed as search data within the index.

Equation (1) depicted below is a formula that can be used to calculate the estimated ingestion time of either a divisible or indivisible file being ingested:

$$G(n, r, m) = \frac{nXF(r, m)}{r} + S \qquad (1)$$

The variable G expresses the estimated ingestion time of a file as a function of n, r and m, wherein n is the number of divisible element (i.e., lines or divisions) from the beginning of the file, r is the total number of divisible elements (such as lines or divisions), and m is the amount of data for each divisible element identified. Upon the ingestion of an indivisible file, the variables n and r may both be set to a value of 1. Furthermore, the expression F(r, m) is a multiple regression analysis function calculating ingestion time of a file estimated using a maximum number of users consuming hardware resources of an on-premises or cloud environment simultaneously, while the variable S may be the time the file started being ingested from a data source server by a crawler module.

When it comes time for users to search the index, a search condition may be internally added to the search query by a search server. The internal search condition may limit the search to only search data with an estimated ingestion time that is older than the current time that the search query was submitted. By adding such an internal condition, embodiments of the present disclosure may prevent search data already indexed by the index but comprise estimated ingestion times that are newer than the current time of the search query from appearing as a search result to a mining user searching the index.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1A illustrates a block diagram of an embodiment of a computing system 100, which may be a simplified example of a computing device (i.e., a physical bare metal system or virtual system) capable of performing the computing operations described herein for estimating ingestion time of files indexed and made searchable for content mining. Computing system 100 may be representative of the one or more computing systems or devices implemented in accordance with the embodiments of the present disclosure and further described below in detail. It should be appreciated that FIG. 1A provides only an illustration of one implementation of a computing system 100 and does not imply any limitations regarding the environments in which different embodiments may be implemented. In general, the components illustrated in FIG. 1A may be representative of any electronic device, either physical or virtualized, capable of executing machine-readable program instructions.

Although FIG. 1A shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 1B:
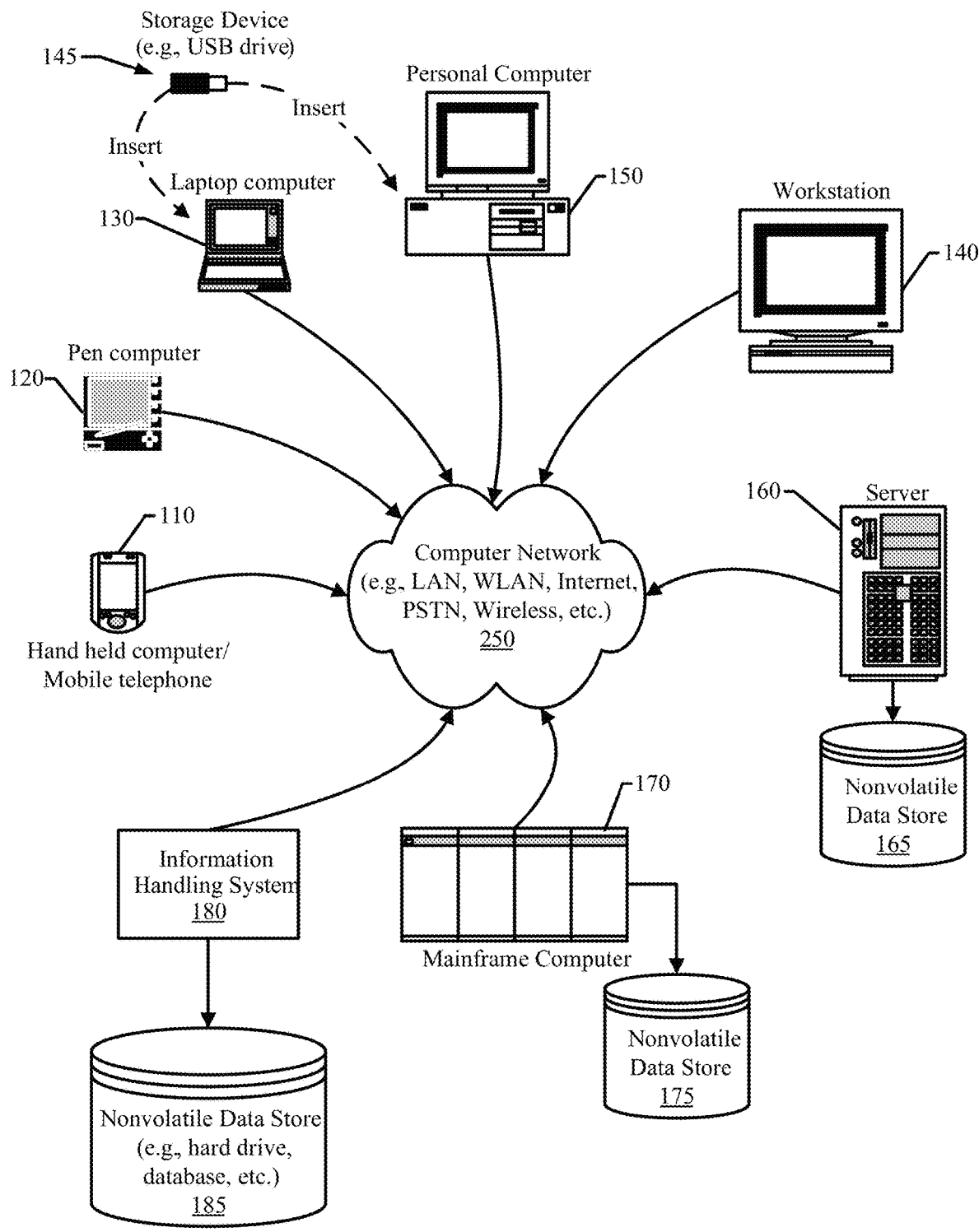
FIG. 1B depicts a block diagram illustrating an extension of the computing system environment of FIG. 1A, wherein the computing systems are configured to operate in a network environment and perform methods described herein in accordance with the present disclosure.

FIG. 1B provides an extension of the computing system 100 environment shown in FIG. 1A to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet, computer 120, laptop, or notebook, computer 130, workstation 140, personal computer system 150, and server 160. Other types of information handling systems that are not individually shown in FIG. 1B are represented by information handling system 180. As shown, the various computing systems 100 can be networked together using computer network 250. Types of computer network 250 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the computing systems 100. Many of the computing systems include nonvolatile data stores, such as hard drives and/or nonvolatile memory. The embodiment of the information handling system shown in FIG. 1B includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems.

System for Estimating Ingestion Time of Files Indexed and Made Searchable for Content Mining It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 2:
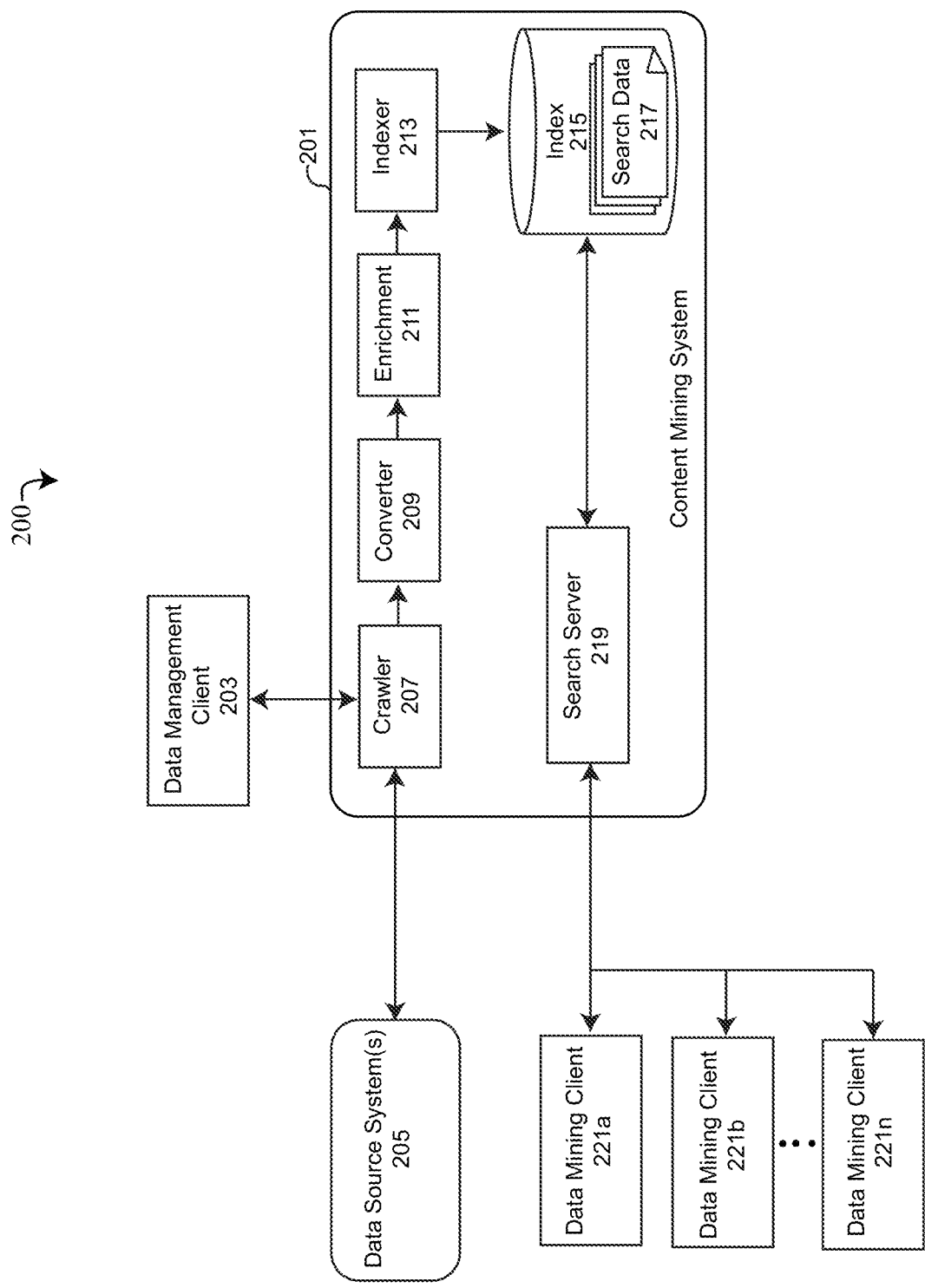
FIG. 2 depicts a functional block diagram describing an embodiment of a computing environment for estimating an ingestion time until one or more ingested files become searchable data within a content mining system in accordance with the present disclosure.

Referring to the drawings, FIG. 2 depicts an embodiment of a computing environment 200 comprising one or more computing systems 100 and variations thereof, to implement systems, methods, and computer program products for content mining, and more specifically, may include systems, methods and computer program products for estimating ingestion time of files indexed and made searchable for content mining. Embodiments of computing environment 200 may include one or more computing systems 100 interconnected via a network. In the exemplary embodiments depicted in FIG. 2 the computing systems 100 connected to the computing network may be specialized systems or devices that may include, but are not limited to, the interconnection of one or more content mining system 201, data source system(s) 205, user device(s) running a data mining client 221a-221n (referred to generally herein as data mining client 221) and/or data management client 203. While content mining system 201, data source system(s) 205, user device(s) running a data mining client 221 and/or data management client 203 may be interconnected via a network, other types of computing systems and devices known or used by a person skilled in the art, may be interconnected as well and/or may be substituted for the computing systems depicting in the Figures.

Embodiments of the specialized computing systems or devices exemplified in FIG. 2 may not only comprise the elements and components of the systems and devices depicted in FIG. 2 as shown, but the specialized computing systems depicted may further incorporate one or more elements or components of computing system 100 shown in FIG. 1A and described above. Although not shown in the Figures, one or more elements of computing system 100 may be integrated into the embodiments of content mining system 201, data source system(s) 205, user device(s) running a data mining client 221 and/or data management client 203, wherein the components integrated into the specialized computing systems include (but are not limited to) one or more processor(s) 103, program(s) 114, memory 105, persistent storage 106, cache 107, communications unit 111, I/O interface(s) 115, external device(s) 117 and human-readable display 118.

Embodiments of the network connecting the content mining system 201, data source system(s) 205, user device(s) running a data mining client 221 and/or data management client 203 may be constructed using wired, wireless or fiber-optic connections. The content mining system 201, data source system(s) 205, and user device(s), whether real or virtualized, may communicate over the network via a communications unit 111, such as a network interface controller, network interface card, network transmitter/receiver or other network communication device capable of facilitating communication across the network. In some embodiments of computing environment 200, content mining system 201, search server 219 and data source system(s) 205 may represent computing systems 100 utilizing clustered computing and components acting as a single pool of seamless resources when accessed through network by one or more user device(s). For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between content mining system 201, data source system(s) 205, search server 219 and/or user device(s). Communications unit 111 may further allow for a full network protocol stack, enabling communication over a network to groups of computing systems 100 linked together through communication channels of the network. The network may facilitate communication and resource sharing among the content mining system 201, data source system(s) 205, search server 219 and/or user device(s) analyzing search data 217 of the content mining system 201 or ingesting files into the content mining system 201. Examples of the network may include a local area network (LAN), home area network (HAN), wide area network (WAN), backbone networks (BBN), peer to peer networks (P2P), campus networks, enterprise networks, the Internet, single tenant or multi-tenant cloud computing networks, wireless communication networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
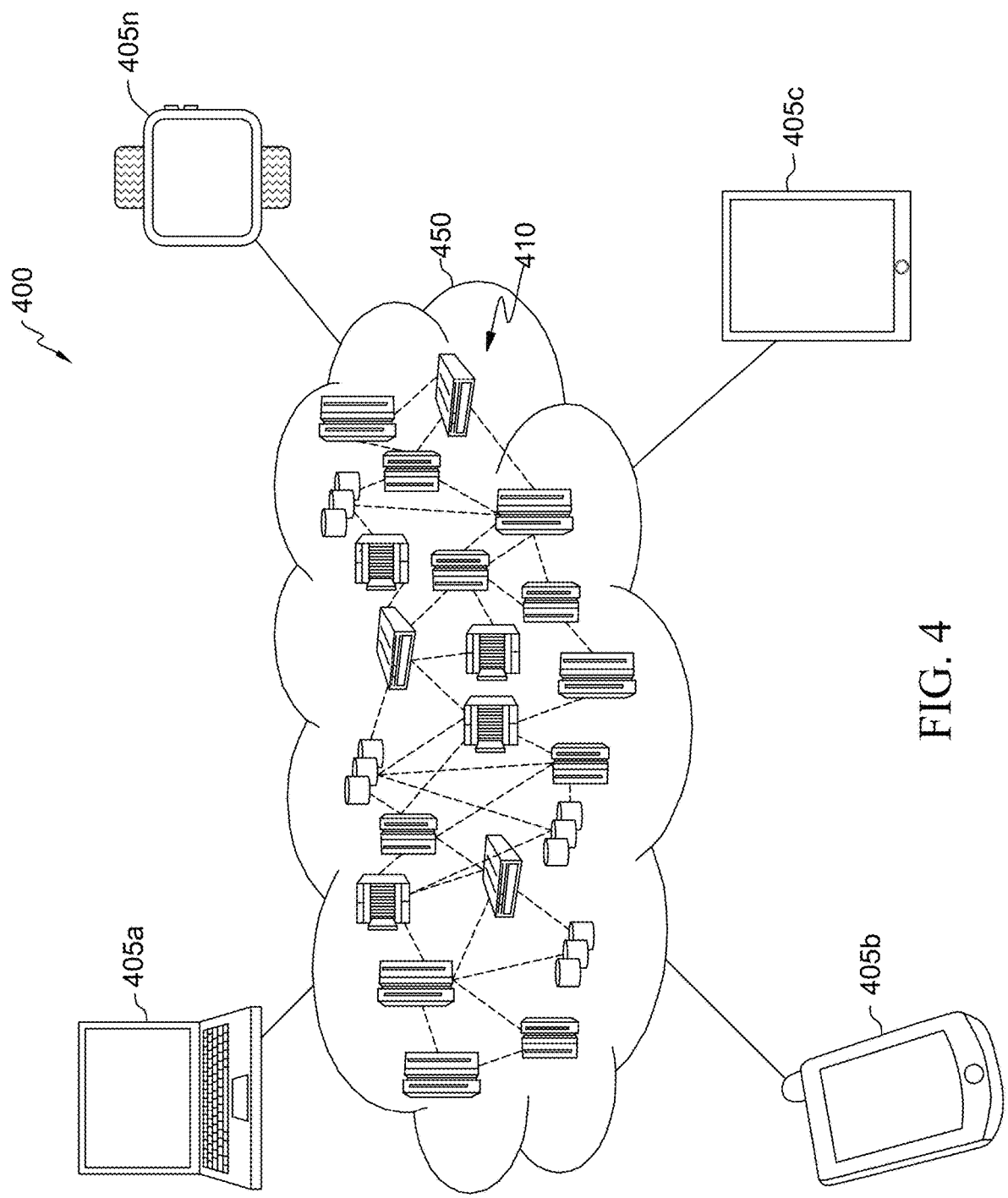
FIG. 4 depicts a block diagram illustrating a cloud computing environment in accordance with the present disclosure.

Referring to the drawings, FIG. 4 is an illustrative example of a cloud computing environment 400. As shown, cloud computing environment 400 includes a cloud network 450 comprising one or more cloud computing nodes 410 with which end user device(s) 405a-405n (referred to generally herein as end user device(s) 405) may be used by cloud consumers to access one or more software products, services, applications, and/or workloads provided by cloud service providers or tenants of the cloud network 450. Examples of the user device(s) 405 are depicted and may include devices such as a smartphone 405b or cellular telephone, desktop computers, laptop computer 405a, tablet computers 405c and smart devices such as a smartwatch 405n and smart glasses. Nodes 410 may communicate with one another and may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of end user devices shown in FIG. 4 are intended to be illustrative only and that computing nodes 410 of cloud computing environment 400 can communicate with any type of computerized device over any type of network and/or network addressable connection (e.g., using a web browser).

Figure 5:
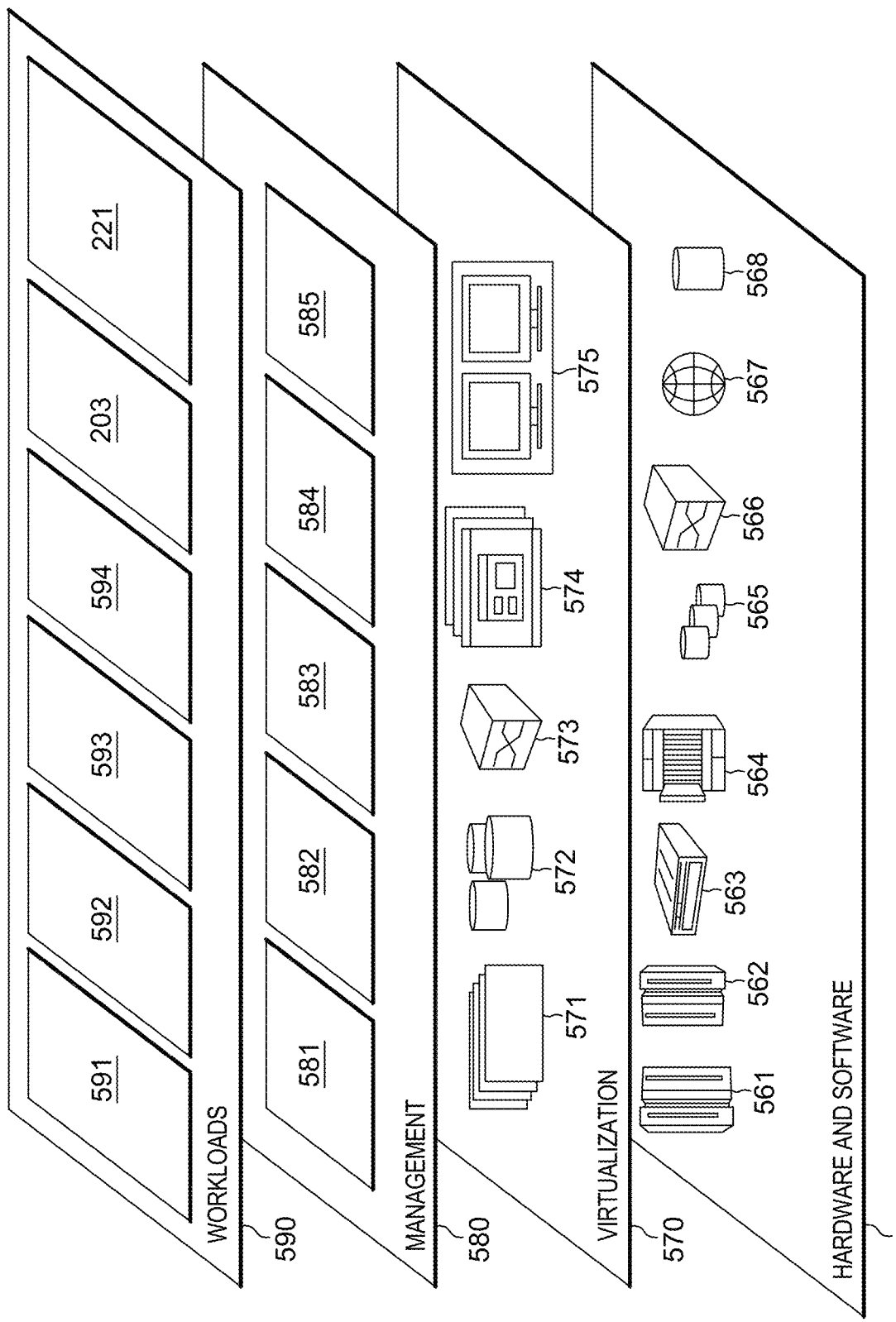
FIG. 5 depicts an embodiment of abstraction model layers of a cloud computing environment in accordance with the present disclosure.

Referring now to FIG. 5, a set of functional abstraction layers provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

Management layer 580 may provide the functions described below. Resource provisioning 581 provides dynamic procurement of computing resources and other resources that are utilized to perform tasks within the cloud computing environment 400. Metering and pricing 582 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 583 provides access to the cloud computing environment 400 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include software development and lifecycle management 591, data analytics processing 592, multi-cloud management 593, transaction processing 594; data ingestion via the data management client 203 and data analysis via data mining client 221.

Referring back to the drawings, FIG. 2 illustrates an embodiment of a computing environment 200 capable estimating an ingestion time of files being ingested from one or more data source system(s) 205 and converting the ingested files into a searchable state organized into an index 215 that may be accessed by one or more data mining clients 221 via a search server 219. Ingestion time for files being ingested may be dependent upon several factors. For example, hardware resources such as processors 103, memory 105 and persistent storage 106; the type and amount of data being ingested; the settings of users and degree of additional information such as the facets or sentiment being added to the data being ingested. Embodiments of the computing environment 200 may be part of a centralized or de-centralized network comprising a distribution of real or virtualized computing nodes communicating with one another across the network. A "node" of a network may refer to a connection point, redistribution point or a communication endpoint of the network. In the exemplary embodiment, computing environment 200 may comprise nodes such as the content mining system 201, data source system(s) 205, and one or more endpoint devices that may be operated by a data manager accessing content mining system 201 via a data management client 203 and/or mining user accessing the search server 219 of the content mining system 201 via a data mining client 221.

Embodiments of the content mining system 201 may be responsible for performing a plurality of functions, features, tasks and processes discussed herein with regard to the ingestion, transformation, indexing and analysis of the ingested files. The plurality of the functions, tasks and services of the content mining system 201 may be provided to both data managers seeking to ingest files into the content mining system 201 as well as the plurality of mining users seeking to search and access an index 215 comprising search data 217. Embodiments of the various functions, tasks, processes, services and routines of the content mining system 201 being provided to data managers and mining users, may be performed by one or more components or modules of the content mining system 201. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200. For instance, in the exemplary embodiment depicted in FIG. 2, the content mining system 201 includes a plurality of modules, including (but not limited to) a crawler 207, converter 209, enrichment 211, indexer 213 and search server 219.

Embodiments of crawler 207 may be a software module responsible for performing the functions or tasks of the content mining system 201 directed toward accessing and/or ingesting one or more files from one or more data source system(s) 205. For example, a content management system or a file server storing the files being accessed by the crawler 207. The data manager responsible for ingesting files into the content mining system 201 may interface with the crawler 207 using a data management client 203. Data management client 203 may access the services of crawler 207 and allow the data manager to input configurations and/or or requests to the crawler 207, instructing the crawler 207 to access and retrieve the files from one or more data source systems 205. Embodiments of the crawler 207 may ingest the files retrieved from the data source system(s) 205 and pass copies of the retrieved files from the data source system 205 to converter 209.

Embodiments of converter 209 may be a software module responsible for extracting text data and/or metadata (such as file names) within the files ingested by crawler 207. During the extraction of the text data and metadata from the ingested files, the converter 209 may extract one or more field names from a file, as well as the values corresponding to each of the field names. Embodiments of converter 209 may specify the file type of the ingested files and identify whether or not the file being ingested is divisible into a plurality of elements comprising portions of data that can be treated as independent data for the purpose of searching the data. Examples of divisible file types that can be divided into a plurality of elements each having independent data within divisible elements may include comma-separated value (CSV) files, JavaScript Object Notation (JSON) files, portable document format (PDF) files and Word files. Some file formats, such as PDF and Word files may be considered divisible, however, PDF and Word files may be internally converted by converter 209 into a JSON format. Once converted into JSON, the array format of the JSON file can be divided into separate divided elements and treated as independent data.

FIG. 3A depicts an example of a portion of a CSV file 301 ingested into content mining system 201 by a crawler 207. As shown, the CSV file 301 comprises a set of data, including text data, that can be extracted from the CSV file 301 and divided into lines of independent data that can be treated separately from one another. In this example, the CSV file 301 includes a header 303 defining a plurality of field names and extractable values 305, 307 found on the second line and the third line of the CSV file 301 corresponding to the field names of the header 303. When ingesting the data of a file, such as CSV file 301, a column for each field name of the header can be created and the data for each row of the CSV file 301 can be inserted into an appropriate value column as the data is extracted from the CSV file 301.

For example, as shown in FIG. 3A, the header 303 includes field names such as claim_id, date, claim_product, claim_location, client_age and the body comprising feedback from the customer in this particular example. Converter 209 may extract from the second line of CSV file 301, corresponding values 305 for each field name of the header 303. For example, looking at the values 305 of the second line from left to right, converter can identify the claim_ID=0, claim_date=Jan. 1, 2016, the claim_product=lemon tea, the client_location=Manhattan, the client_age=20, and that the body of the customer's feedback indicated "The straw was missing from the juice pack." Likewise, the converter 209 may further extract the third line values 307 of CSV file 301, wherein the converter 209 extracts claim_ID=1, claim_date=Jan. 2, 2016, the claim_product=vanilla ice cream, the client_location=Queens, the client_age=22, and that the body of the customer's feedback indicated "I purchased ice cream and found a foreign object inside the cup."

Embodiments of converter 209 may also perform the function of calculating an estimated ingestion time (G) for transforming the extracted data of the file being ingested by the content mining system 201 into a searchable state that may be accessed by one or more mining users via a search server 219. The estimated ingestion time of a divisible file may vary depending on the number of divisible elements (i.e., lines or divisible sections, depending on the file type or format) within a particular file being ingested and the amount of data within each of the divisions. Converter 209 may calculate the estimated ingestion time (G) for each divisible element of a divisible file comprising an element treated as independent data, using an equation expressing G(n, r, m) as follows:

$$G(n, r, m) = \frac{nXF(r, m)}{r} + S$$

wherein, the variable "n" is a line number indicating the number of lines measured from the beginning of the file being ingested, "r" is the total number of divisions and/or lines (in the case of CSV files) within the file being ingested, "m" is the amount of data included in the line being estimated for ingestion time, and "S" is a time at which ingestion of the file started being ingested by the content mining system 201.

Moreover, the expression F(r, m) may be a calculation by the converter 209 estimating ingestion time of the file according to a multiple regression analysis. The expression of ingestion time (F) is based on the maximum number of users in a single tenant cloud, multi-tenant cloud and/or on-premises environment that may be simultaneously using the computing resources of the content mining system 201. The calculated ingestion time (F) can fluctuate based on the total amount of available resources and the maximum number of simultaneous users that may be supported by the cloud services. The availability of computing resources allocated to the content mining system 201 may impact the system's ability to support a larger or smaller maximum number of simultaneous users. Prior to starting cloud services in a multi-tenant environment, ingestion time (F) can be initially measured based on the initial allocation of computing resources for the cloud services of the content mining system 201 and an estimated maximum number of users accessing the content mining system 201 using settings estimated to be the most time-consuming for ingesting new files and transforming the files into a searchable state. The measurement of ingestion time (F) may be denoted as an ingestion time per unit of data.

Over time, as allocated computing resources are increased or decreased for the cloud services provided by the content mining system 201 the estimation of ingestion time (F) based on the maximum number of simultaneous users may need to be periodically re-calculated by converter 209. The updated calculation of ingestion time (F) for the estimated maximum number of users may be applied to the estimated ingestion time (G) using the expression G(n, r, m), in order to accurately account for changes in the allocated computing resources of the content mining system 201 that may be scaling up or scaling down resources and thus affecting the overall ingestion time of files. Upon calculation (or re-calculation) of the estimated ingestion time based on the expression of G(n, r, m), converter 209 may add the estimated ingestion time (G) to the file as internal data which may be accessible by the content mining system 201. For example, the internal data comprising estimated ingestion time (G) can be viewed and added to the index 215 by the indexer 213.

Embodiments of the converter 209 may also calculate an estimated ingestion time (G) for files being ingested that are not divisible. For example, in an instance where the file being ingested is a text file or an HTML file, the estimated ingestion time may be dependent on the file size denoted by the variable "m", since there is only one division and only one line from the beginning of the undividable text or HTML file. The expression G(n r, m) may be denoted as G(1, 1, m) when calculating ingestion time for files that cannot be divided into a plurality of elements having independent data. Therefore n=1 and r=1 when calculating the ingestion time (G). In some embodiments, certain file formats may or may not be divisible. For example, a PDF, WORD or JSON file may be analyzed and determined by the converter 209 whether the file is divisible after ingestion of the file has commenced. If the file is divisible by the converter 209, then ingestion time is estimated using G(n, r, m) after dividing the file, wherein r is the total number of divisions, n is a division number calculated from the beginning of the file for the division being estimated with an ingestion time and m is the total amount data in the file. For example, in a JSON file, the total amount of data for m may be the total amount of data for the values of objects included within each element of the JSON file. Likewise, in an instance where a file being ingested cannot be divided after ingestion has begun, converter 209 may calculate the estimated ingestion time (G) based on the expression of G(1, 1, m).

Embodiments of the content mining system 201 may comprise an enrichment 211 module. Enrichment 211 may be a software module that may add additional information and/or context to the text data and/or metadata extracted from the ingested files by the converter 209. The enrichment of the data extracted by the converter 209 may enhance the existing information of the ingested files by supplementing the missing data or incomplete data with other sources of data from secondary sources. For example, in some instances, enrichment 211 may use an external data source such as another data source system 205 to enhance or fill in incomplete or missing information about the file ingested by crawler 207. Embodiments of the enrichment 211 module may add or merge third party data from an external data source with the extracted text data or metadata in order to make the extracted data of the ingested file more useful and detailed, allow mining users searching an index 215 for the search data 217 to make more informed decisions. For example, basic customer data ingested from data source system 205 may be enriched by enrichment 211 with additional demographic data about the customer, geographic data and/or identify relationships between customers. In some embodiments enrichment 211 module may add additional context to the data extracted from the ingested files. For example, enrichment 211 module may use natural language processing (NLP) and/or natural language understanding (NLU) to tag parts of speech to the text of the extracted data or identify sentiment associated with the text extracted by converter 209.

Indexer 213 may be a software module that prepares and/or updates an index 215 with the information and data (or metadata) extracted from the ingested file and enriched by the enrichment 211 module. Indexer 215 stores the extracted and enriched data in a searchable format within the index 215 that can be accessed and analyzed by users via the search server 219 or other interface, such as an application programming interface (API) loaded onto a user device of a mining user. Indexer 213 may not only add the extracted and enriched data to the index 215 but may also add internal data provided by the converter 209. For example, the internal data describing an estimated ingestion time (G) as calculated by converter 209 for each line or division of the file being ingested. An ingestion time field may be added to each separate portion of the indexed data, when storing the corresponding data of each line or division of the ingested file to the index 215.

FIG. 3B depicts an example of search data 217 extracted as independent elements from CSV file 301 and stored to one or more records of an index 215 by indexer 213. As shown, indexer 213 creates separate and distinct search data 217 within the index 215 which corresponds to the divisible elements of the CSV file 301, creating separate and distinct search data 217a, 217b corresponding to either values 305 or values 307 respectively. For example, for the search data 217a record indexed to a first searchable record of index 215, the indexer 213 may create a column 303a comprising the field names extracted from header 303 of the CSV file 301. Indexer 213 adds each of the values 305 to the corresponding field names as part of the record of search data 217a. In some embodiments, indexer 213 may further add additional fields and data values inserted into the CSV file 301 as part of the enrichment of the text data or metadata of the CSV file 301. Moreover, Indexer 213 may also add any internal data to the search data 217a, including an additional estimated ingestion time field in column 303a and a corresponding value 305, calculated by the converter 209 as discussed in detail above.

Similar to the record of search data 217a added to index 215, created from CSV file 301, a separate and independent data record comprising one or more elements of CSV file 301 may be added to a second record comprising search data 217b. As shown, the data values 307 corresponding to search data 217b are extracted from a separate line of the CSV file 301 than search data 217a comprising values 305 and therefore are separate records with distinctly different values, even though they both may be extracted from the same CSV file 301. The record of search data 217b includes a column 303b containing the field names of header 303 and a second column comprising a set of values, each corresponding to one or more of the field names in column 303b. Moreover, additional data may be indexed to the record of search data 217b by indexer 213. For example, enrichment data obtained by the enrichment 211 module and/or internal data such as an estimated ingestion time (G) may be added to the column 303b, along with the corresponding data values 307. The ingestion time (G) stored to index 215 for the record of search data 217b may differ from the ingestion time (G) stored to index 215 for the record of search data 217a, since the elements of search data 217a and 217b are treated as independent data, including independently calculated estimates for ingestion time (G).

Embodiments of content mining system 201 may comprise a search server 219. The search server 219 may be a software module that receives and/or responds to search queries or analysis requests from one or more user seeking to access the search data 217 of index 215. Mining users may access the search server 219 to input instructions, requests and/or search queries using a software program that can interface with the search server 219. For example, in the exemplary embodiment depicted in FIG. 2, users seeking to mine search data 217 stored by index 215 may interface with search server 219 using a data mining client 221a-221n or another type of API capable of interfacing with the search server 219. Although only three mining clients are depicted in FIG. 2, any number of user devices (whether real or virtual) executing one or more instances of the data mining client 221 (or other search server API) may be used to access and search the data stored by index 215.

Embodiments of search server 219 may add one or more internal conditions to the incoming search queries received from a data mining client 221. For example, search server 219 may limit search results of the index 215 to include only search data 217 that has completed the ingestion and indexing process by adding an internal condition that the estimated ingestion time (G) is older than the current time being displayed by the content mining system 201. By adding such a condition, records with an estimated ingestion time for being placed into a searchable state that is a future time, beyond the current time, will not appear in the search results of index 215 provided by the search server 219, preventing partially ingested or incomplete search data 217 from being returned as part of the search query before ingestion and indexing of the file has completed.

Figure 6:
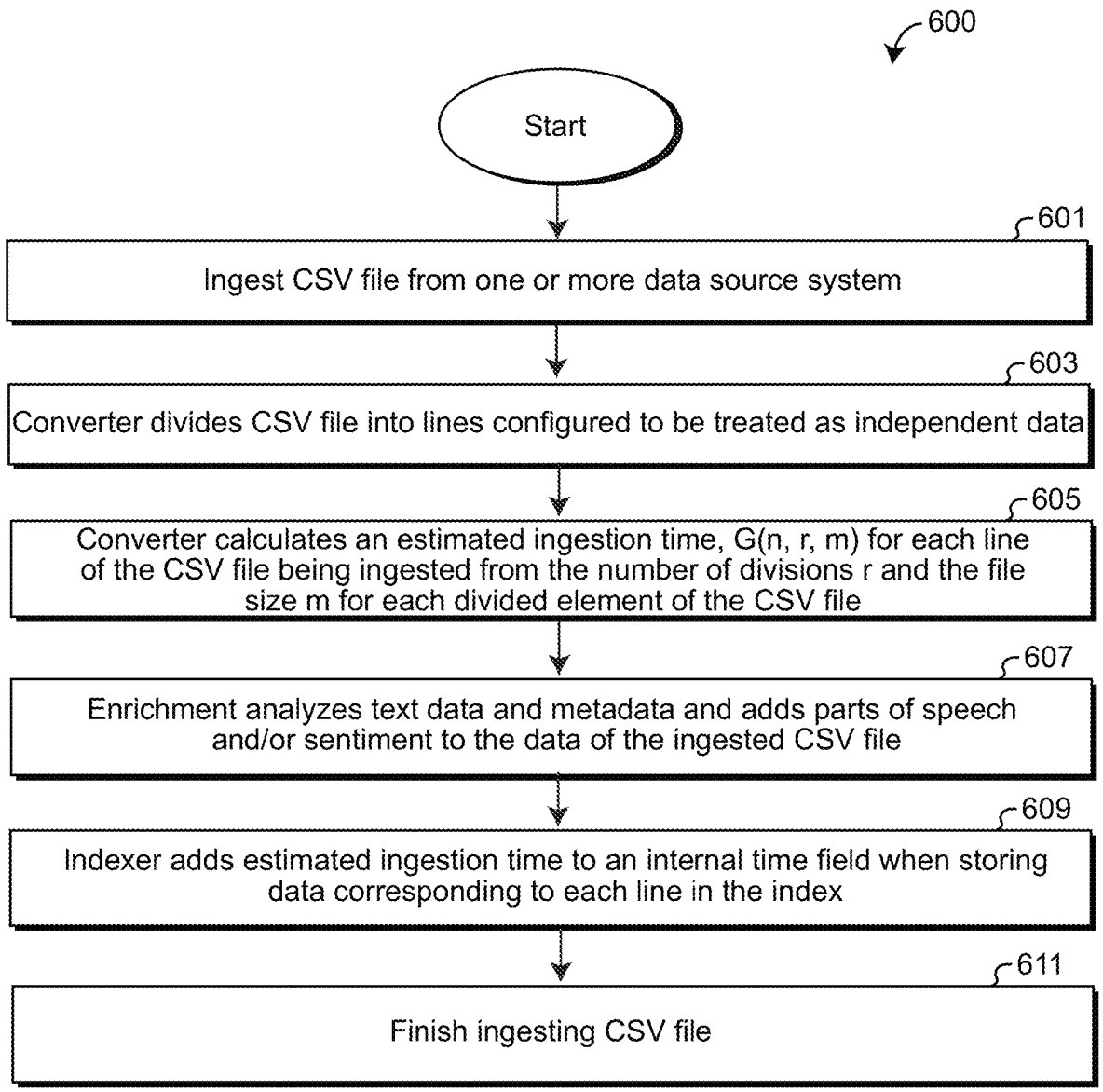
FIG. 6 depicts a flow diagram describing an embodiment of a method for estimating ingestion time of a CSV file in accordance with the present disclosure.
Figure 7:
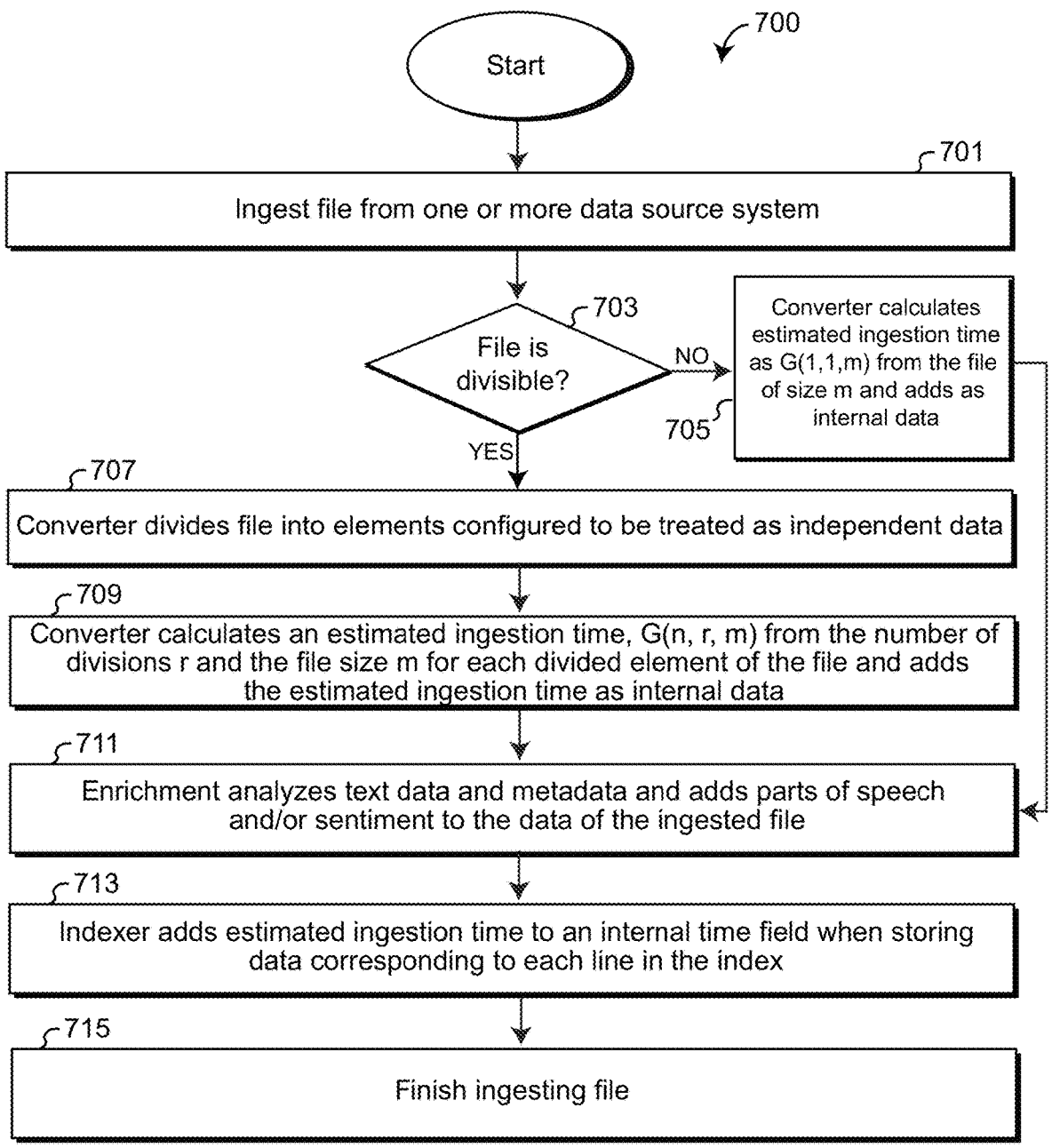
FIG. 7 depicts a flow diagram describing an embodiment of a method for estimating ingestion time of divisible and indivisible files in accordance with the present disclosure.
Figure 8:
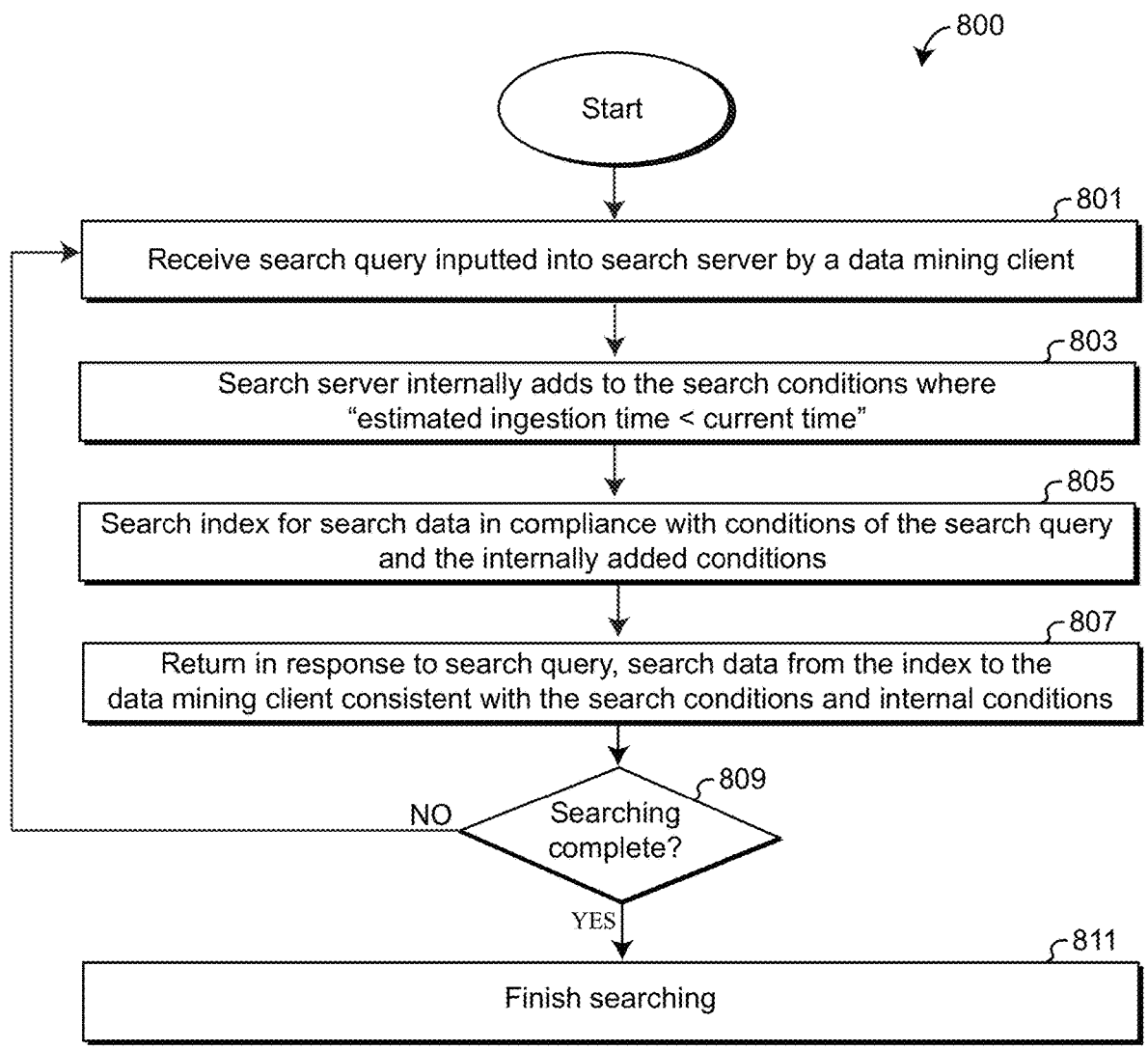
FIG. 8 depicts a flow diagram describing an embodiment of a method for searching an index comprising data ingested from one or more files in accordance with the present disclosure.

Method for Estimating Ingestion Time of Files Indexed and Made Searchable for Content Mining The drawings of FIGS. 6-8 represent embodiments of methods for ingesting files for content mining and searching the ingested files that are indexed, as described in accordance with FIGS. 2-5 above, using one or more computing systems defined generically by computing system 100 of FIGS. 1A-1B; and more specifically by the embodiments of specialized computer systems depicted in FIGS. 2-5 and as described herein. A person skilled in the art should recognize that the steps of the method described in FIGS. 6-8 may be performed in a different order than presented and may not require all the steps described herein to be performed.

FIG. 6 may refer to a method 600 for estimating ingestion times for CSV files being ingested, divided, enriched and added to an index 215 to become searchable as search data 217 by content miners. The embodiment of the method 600 may begin at step 601. During step 601 a data manager may instruct and/or configure a crawler 207, via a data management client 203 to ingest a CSV file 301 stored by one or more data source system(s) 205 into a content mining system 201. Upon manual instructions or an automated configuration to ingest one or more files, such as CSV file 301, the crawler 207 may access a data source system 205, such as a server or data repository storing the specified CSV file 301 and retrieve a copy of the CSV file 301 as requested by the data manager. The crawler 207 may provide the requested CSV file 301 to a converter 209 for data and/or meta data extraction.

In step 603, converter 209 may divide CSV file 301 along a plurality of divisible elements such as lines or divisions within the CSV file 301. Each of the lines or divisions being identified by converter 209 may contain a plurality of data elements that may be treated by the converter 209, enrichment 211 and/or indexer 213 as independent data that may be considered separate and distinct from other lines or divisions within the CSV file 301. In step 605 of method 600, converter 209 calculates an estimated ingestion time using the expression G(n, r, m) described in detail herein. For each line or division of the CSV file 301 being ingested, converter 209 independently calculates the estimated ingestion time (G), based on the number of lines or divisions (r), the line number (n) measured from the start of the CSV file 301 and the size of data (m) within the line or division having the ingestion time calculated. Converter 209 may insert the estimated ingestion time (G) as internal data by adding a new field within the CSV file 301 and the corresponding value for ingestion time (G) to the line or division of the CSV file 301.

In step 607, the data of the ingested CSV file 301 processed by converter 209 may be further enriched by the enrichment 211 module. During the enrichment process, enrichment 211 may enrich the data of the CSV file 301 in order to add additional details to the data or improve data of the CSV file 301 that may be considered incomplete. For example, enrichment 211 may retrieve additional data corresponding to the data of the CSV file 301 from third party or other first party data source system(s) 205 or data repositories. In some of method 600, enrichment 211 may enrich the text data and/or metadata of CSV file 301 by adding additional context to the data. For example, by adding parts of speech to the text, descriptive tags, keywords or classifications, and/or add sentiment.

In step 609, indexer 213 processes and formats each of the lines or divisions of data comprising the independent data elements in order to be placed into index 215 in a searchable state. Each line or division within the CSV file 301 may be processed as a separate record or entry within index 215. During the processing and formatting of the CSV file 301 into a searchable state, indexer 213 may add the internal data, such as the estimated ingestion time (G) calculated by converter 209 to the index 215 record as an internal time field. As the indexer 213 stores the search data 217 to the records of index 215, each line or division may now include the estimated ingestion time as part of an additional internal time field which includes the estimated ingestion time calculated by converter 209 within the corresponding data value. In step 611, upon completion of indexing the divisions or lines of the CSV file 301, the ingestion of the CSV file is complete and searchable by mining users via search server 219.

FIG. 7 may refer to an embodiment of a method 700 for estimating ingestion times for both divisible and indivisible files being ingested, enriched and added to an index 215 to become searchable as search data 217 by content miners. The embodiment of the method 700 may begin at step 701. During step 701 a data manager may instruct and/or configure a crawler 207, via a data management client 203 to ingest one or more files stored by one or more data source system(s) 205 into a content mining system 201. Upon manual instructions or an automated configuration to ingest one or more files, the crawler 207 may access a data source system 205, such as a data server or data repository storing the specified files and retrieve a copy of the files as requested by the data manager. The crawler 207 may provide the requested file to a converter 209 for identifying the file type, whether or not the file type is divisible into one or more data elements that can be treated as independent data and/or perform extraction of the data from the divisible or indivisible files.

In step 703 of method 700, a determination is made by converter 209 whether or not the identified file type and/or content of the file is divisible. If, the determination is made by the converter that the file being ingested in not divisible, method 700 may proceed to 705, wherein the converter 209 may perform data extraction for the indivisible file as a whole, instead of individual lines or division. Converter 209 may calculate an estimated ingestion time (G) for the entire file being ingested using the expression G(n, r, m), wherein the variables n and r for the indivisible file are equal to a value of 1, thus the expression for the estimated ingestion time may be written as G(1, 1, m), wherein ingestion time for the file may be mostly dependent upon the file size, m. During step 705, the converter may add the estimated ingestion time (G) for the indivisible file type being ingested, as internal data within the file. Once ingestion time (G) has been estimated for the file and added as internal data, method 700 may proceed from step 705 to the enrichment step of step 711.

Referring back to step 703 and the determination made by converter 209 whether or not the identified file type and/or content of the ingested file is divisible, if the determination by the converter 209 is that the file being ingested is a file type that is divisible and/or can be converted to a divisible file type (i.e., such as a PDF or Word file to a JSON), the method 700 may proceed to step 707. During step 707, converter 209 may divide the file along a plurality of lines or divisions within the file and/or internally convert the file to a file type that can be divided into a plurality of divisions. Each of the divisions being created by converter 209 may contain a plurality of data elements that may be treated by the converter 209, enrichment 211 and/or indexer 213 as independent data that may be considered separate and distinct from other lines or divisions within the file. In step 709 of method 700, converter 209 calculates an estimated ingestion time using the expression G(n, r, m). For each line or division of the divisible file being ingested, converter 209 independently calculates the estimated ingestion time (G) based on the number of lines or divisions (r), the line number (n) measured from the start of the CSV file 301 and the size of data (m) within the line or division having the ingestion time calculated. Converter 209 may insert the estimated ingestion time (G) as internal data by adding a new field within the divisible file for each line or division and the corresponding value for ingestion time (G) to the line or division of the divisible file.

In step 711, the data of the ingested file (whether divisible or indivisible) processed by converter 209 may be further enriched by the enrichment 211 module. During the enrichment process, enrichment 211 may enrich the data of the file in order to add additional details to the data or improve data of the file that may be considered incomplete. For example, enrichment 211 may retrieve additional data corresponding to the data of the file being ingested from third party or other first party data source system(s) 205 or data repositories. In some embodiments of method 700, enrichment 211 may enrich the text data and/or metadata of the files by adding additional context to the data. For example, by adding parts of speech to the text, descriptive tags, keywords or classifications, and/or add sentiment.

In step 713, indexer 213 processes and formats each of indivisible files as well as each of the lines or divisions of data comprising the independent data elements of the divisible files in order to be placed in a search state within index 215. Each indivisible file or division within the divisible file may be processed as a separate record or entry within index 215. During the processing and formatting of the files being ingested into a searchable state, indexer 213 may add the internal data, such as the estimated ingestion time (G) calculated by converter 209 to the index 215 record as an internal time field. As the indexer 213 stores the search data 217 to the records of index 215, each indivisible file and/or division of the divisible files may now include the estimated ingestion time as part of an additional internal time field which includes the estimated ingestion time calculated by converter 209 within the corresponding data value. In step 715, upon completion of indexing the indivisible and/or divisible files, the ingestion of the file may be complete and searchable by mining users via search server 219.

FIG. 8 may refer to an embodiment of a method 800 for mining content by searching an index 215 comprising files ingested into the content mining system 201 in accordance with method 600 as described in accordance with FIG. 6, method 700 as described in accordance with FIG. 7, and variations of methods thereof. Method 800 may begin at step 801. During step 801, a search server 219 may receive a search query from a mining user. The search query may be submitted from a user device of the mining user via a client, such as the data mining client 221 or other API capable of accessing the services of the search server 219. Embodiments of the search query inputted into the search server 219 by the data mining client, may include one or more conditions and/or parameters for searching index 215 in order to retrieve search data 217 with the desired conditions or parameters.

In step 803, the search server may modify the search query received in step 801 by internally adding to the search conditions of the search query. The internally added condition may require the search server to retrieve from the index 215 only search data with an estimated ingestion time (G) that is less than the current time at which the search query was submitted to the search server 219. In step 805, the search server searches the records of index 215 for search data 217 in compliance with the conditions of the search query and the internal condition added by the search server 219. For example, while the search server 219 is searching the index 215 for matches, search server 219 may check the internally added field of the index 215 comprising the estimated ingestion time (G) against the current time. The search query will not return any data that has an estimated time>than the current time, even if the data has been ingested.

In step 807, the search server 219, in response to the search query, returns search data 217 from the index 215 to the data mining client 221 that meets the search condition provided by the mining user and complies with the internal conditions inserted by search server 219. In step 809, the search server 219 determines whether or not searching has been completed by the mining user. For example, the search server 219 may check a search queue to determine whether or not any additional search queries have been inputted by a mining user that need an action by the search server. If searching is not complete because additional search queries are awaiting a response from the search server 219, the method 800 may return to step 801 and may iteratively repeat method 800 for each subsequent search query, adding internal conditions to each new search being performed. Moreover, upon no additional search queries awaiting a response from search server 219, the method 800 may proceed from step 809 to step 811, wherein the search server 219 has finished searching the index 215 and may await input from a mining user requesting a new search query.

What is claimed is:

1. A computer-implemented method for ingesting, and transforming a file into a searchable state, the method comprising:
    ingesting, by a processor, the file from a data source system storing the file, wherein a crawler accesses the data source system and retrieves the file based on an automated configuration to ingest one or more files associated with the data source system;
    extracting, by the processor, text data and metadata from the file being ingested, including field names and values;
    enriching, by the processor, the extracted text data by adding context to the extracted text data, wherein the context is selected from the group consisting of a part of speech, a descriptive tag, a keyword, a classification, and a sentiment;
    identifying, by the processor, whether the file is divisible into a plurality of divided elements, based on the file type of the file being ingested, where each of the plurality of divided elements are treated as independent data;
    for each file that is identified as divisible based on the file type, transforming, by the processor, the file into the searchable state by:
        dividing, by the processor, the file into the plurality of divided elements;
        generating, by the processor, an estimate of ingestion time (G) for each of the divided elements of the file, wherein the estimated ingestion time considers a number of the divided elements in the file, an amount of data included in the divided elements of the file, a start time of ingestion of the file, and an ingestion time estimated with a maximum number of users using computing resources simultaneously;
        scaling, by the processor, the computing resources up or down based on the generated estimate of the ingestion time and the maximum number of users; and
        indexing, by the processor, the text data and metadata extracted from the file as search data, to an index and inserting the estimate of ingestion time for each of the divided elements of the file into an internal field of the search data of the file being indexed.

2. The computer-implemented method of claim 1, wherein the estimated ingestion time (G) is calculated using a function $$G(n, r, m) = \frac{nXF(r, m)}{r} + S,$$

wherein r is the number of divided elements in the file, m is the amount of data included in the divided elements of the file, n is a line number starting from a beginning of the file, S is the start time of the ingestion of the file, and F(r, m) is the ingestion time estimated with the maximum number of users using the computing resources simultaneously.

3. The computer-implemented method of claim 2, further comprising:
    wherein upon the file being identified as being divisible, dividing, by the processor, the file into the plurality of elements configured to be treated as independent data; and wherein upon the file is identified as not being divisible, the step of calculating the ingestion time using the function G(n, r, m), n=1 and r=1.

4. The computer-implemented method of claim 1, further comprising:
receiving, by the processor, a search query inputted into a search server comprising a search condition;
adding to the search query, by the processor, an internal condition wherein the estimated ingestion time prior to a current time;
searching, by the processor, the index for the search data in compliance with the search condition and the internal condition; and
returning in response to the search query, the search data from the index that satisfies the search condition and the internal condition.

5. The computer-implemented method of claim 1, wherein the maximum number of users using computing resources simultaneously are the maximum number of users of a multi-tenant cloud computing environment.

6. The computer-implemented method of claim 1, wherein the file is a divisible file in a format selected from the group consisting of comma-separated values (CSV) file, a portable document format (PDF) file, a JavaScript Object Notation (JSON) file, and a Word file.

7. The computer-implemented method of claim 3, wherein the file identified as not being divisible is a text file or a Hypertext Markup Language (HTML) file.

8. A computer program product for ingesting, transforming and indexing a file into a searchable state comprising:
one or more computer readable storage media having computer-readable program instructions stored on the one or more computer readable storage media, said program instructions executes a computer-implemented method comprising:
ingesting, by a processor, the file from a data source system storing the file, wherein a crawler accesses the data source system and retrieves the file based on an automated configuration to ingest one or more files associated with the data source system;
extracting, by the processor, text data and metadata from the file being ingested, including field names and values;
enriching, by the processor, the extracted text data by adding context to the extracted text data, wherein the context is selected from the group consisting of a part of speech, a descriptive tag, a keyword, a classification, and a sentiment;
identifying, by the processor, whether the file is divisible into a plurality of divided elements, based on the file type of the file being ingested, where each of the plurality of divided elements are treated as independent data;
for each file that is identified as divisible based on the file type, transforming, by the processor, the file into the searchable state by:
dividing, by the processor, the file into the plurality of divided elements;
generating, by the processor, an estimate of ingestion time (G) for each of the divided elements of the file, wherein the estimated ingestion time considers a number of the divided elements in the file, an amount of data included in the divided elements of the file, a start time of ingestion of the file, and an ingestion time estimated with a maximum number of users using computing resources simultaneously;
scaling, by the processor, the computing resources up or down based on the generated estimate of the ingestion time and the maximum number of users; and
indexing, by the processor, the text data and metadata extracted from the file as search data, to an index and inserting the estimate of ingestion time for each of the divided elements of the file into an internal field of the search data of the file being indexed.

9. The computer program product of claim 8, wherein the estimated ingestion time (G) is calculated using a function $$G(n, r, m) = \frac{nXF(r, m)}{r} + S,$$

wherein r is the number of divided elements in the file, m is the amount of data included in the divided elements of the file, n is a line number starting from a beginning of the file, S is the start time of the ingestion of the file, and F(r, m) is the ingestion time estimated with the maximum number of users using the computing resources simultaneously.

10. The computer program product of claim 9, further comprising:
wherein upon the file being identified as being divisible, dividing, by the processor, the file into the plurality of elements configured to be treated as independent data; and
wherein upon the file is identified as not being divisible, the step of calculating the ingestion time using the function G(n, r, m), n=1 and r=1.

11. The computer program product of claim 8, further comprising:
receiving, by the processor, a search query inputted into a search server comprising a search condition;
adding to the search query, by the processor, an internal condition wherein the estimated ingestion time is prior to a current time;
searching, by the processor, the index for the search data in compliance with the search condition and the internal condition; and
returning in response to the search query, the search data from the index that satisfies the search condition and the internal condition.

12. The computer program product of claim 8, wherein the maximum number of users using computing resources simultaneously are the maximum number of users of a multi-tenant cloud computing environment.

13. The computer program product of claim 8, wherein the file is a divisible file in a format selected from the group consisting of comma-separated values (CSV) file, a portable document format (PDF) file, a JavaScript Object Notation (JSON) file, and a Word file.

14. The computer program product of claim 10, wherein the file identified as not being divisible is a text file or a Hypertext Markup Language (HTML) file.

15. A computer system for estimating an ingestion time of a file indicating an amount of time to transform the file into a searchable state comprising:
a processor; and
a computer-readable storage media coupled to the processor, wherein the computer-readable storage media contains program instructions executing a computer-implemented method comprising:

ingesting, by a processor, the file from a data source system storing the file, wherein a crawler accesses the data source system and retrieves the file based on an automated configuration to ingest one or more files associated with the data source system;

extracting, by the processor, text data and metadata from the file being ingested, including field names and values;

enriching, by the processor, the extracted text data by adding context to the extracted text data, wherein the context is selected from the group consisting of a part of speech, a descriptive tag, a keyword, a classification, and a sentiment;

identifying, by the processor, whether the file is divisible into a plurality of divided elements, based on the file type of the file being ingested, where each of the plurality of divided elements are treated as independent data;

for each file that is identified as divisible based on the file type, transforming, by the processor, the file into the searchable state by:

dividing, by the processor, the file into the plurality of divided elements;

generating, by the processor, an estimate of ingestion time (G) for each of the divided elements of the file, wherein the estimated ingestion time considers a number of the divided elements in the file, an amount of data included in the divided elements of the file, a start time of ingestion of the file, and an ingestion time estimated with a maximum number of users using computing resources simultaneously;

scaling, by the process, the computing resources up or down based on the generated estimate of the ingestion time and the maximum number of users; and indexing, by the processor, the text data and metadata extracted from the file as search data, to an index and inserting the estimate of ingestion time for each of the divided elements of the file into an internal field of the search data of the file being indexed.

16. The computer system of claim 15, wherein the estimated ingestion time (G) is calculated using a function $$G(n, r, m) = \frac{nXF(r, m)}{r} + S,$$

wherein r is the number of divided elements in the file, m is the amount of data included in the divided elements of the file, n is a line number starting from a beginning of the file, S is the start time of the ingestion of the file, and F(r, m) is the ingestion time estimated with the maximum number of users using the computing resources simultaneously.

17. The computer system of claim 16, further comprising:
  wherein upon the file being identified as being divisible, dividing, by the processor, the file into the plurality of elements configured to be treated as independent data; and
  wherein upon the file is identified as not being divisible, the step of calculating the ingestion time using the function G(n, r, m), n=1 and r=1.

18. The computer system of claim 15, further comprising:
  receiving, by the processor, a search query inputted into a search server comprising a search condition;
  adding to the search query, by the processor, an internal condition wherein the estimated ingestion time prior to a current time;
  searching, by the processor, the index for the search data in compliance with the search condition and the internal condition; and
  returning in response to the search query, the search data from the index that satisfies the search condition and the internal condition.

19. The computer system of claim 15, wherein the maximum number of users using computing resources simultaneously are the maximum number of users of a multi-tenant cloud computing environment.

20. The computer system of claim 15, wherein the file is a divisible file in a format selected from the group consisting of comma-separated values (CSV) file, a portable document format (PDF) file, a JavaScript Object Notation (JSON) file, and a Word file.

* * * * *